US010120682B2

(12) United States Patent
Gschwind et al.

(10) Patent No.: US 10,120,682 B2
(45) Date of Patent: Nov. 6, 2018

(54) VIRTUALIZATION IN A BI-ENDIAN-MODE PROCESSOR ARCHITECTURE

(71) Applicant: International Business Machines Corporation, Armonk, NY (US)

(72) Inventors: Michael K. Gschwind, Chappaqua, NY (US); Brett Olsson, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 14/193,610

(22) Filed: Feb. 28, 2014

(65) Prior Publication Data
US 2015/0248293 A1  Sep. 3, 2015

(51) Int. Cl.
| | | |
|---|---|---|
| G06F 15/00 | (2006.01) | |
| G06F 7/38 | (2006.01) | |
| G06F 9/00 | (2006.01) | |
| G06F 9/44 | (2018.01) | |
| G06F 9/30 | (2018.01) | |

(52) U.S. Cl.
CPC ...... *G06F 9/30036* (2013.01); *G06F 9/30032* (2013.01); *G06F 9/30043* (2013.01); *G06F 9/30189* (2013.01)

(58) Field of Classification Search
None
See application file for complete search history.

(56) References Cited

U.S. PATENT DOCUMENTS

| | | | | |
|---|---|---|---|---|
| 5,867,658 A | * | 2/1999 | Lee | ............... G06F 15/177 |
| | | | | 709/222 |
| 5,928,349 A | | 7/1999 | Leon et al. | |
| | | (Continued) | | |

FOREIGN PATENT DOCUMENTS

| | | |
|---|---|---|
| EP | 1182588 A1 | 2/2002 |
| WO | 9806034 A1 | 2/1998 |

OTHER PUBLICATIONS

Mihocka et al., "Virtualization without direct execution or jitting: Designing a portable virtual machine infrastructure", InProceedings of the Workshop on Architectural and Microarchitectural Support for Binary Translation, pp. 55-70. 2008.

(Continued)

*Primary Examiner* — George Giroux
(74) *Attorney, Agent, or Firm* — Cantor Colburn LLP; Steven Bennett

(57) ABSTRACT

Embodiments of systems disclosed herein relate to processor architecture. One such system implements a method that includes the processor obtaining an instruction. The instruction specifies an operation, and also specifies one of the registers as a source register and one of the registers as a destination register. The method also includes the processor obtaining an endian mode and determining that the instruction is an element-ordering-sensitive instruction. Based on the determination that the instruction is an element-ordering-sensitive instruction, the processor executes the instruction by performing the operation on the elements of the source register in accordance with the endian mode and writing a result of the operation to the destination register.

11 Claims, 12 Drawing Sheets

(56) References Cited

U.S. PATENT DOCUMENTS

| | | | | |
|---|---|---|---|---|
| 6,006,325 | A * | 12/1999 | Burger | G06F 9/30087 712/214 |
| 6,016,532 | A * | 1/2000 | Lynch | G06F 9/30043 711/118 |
| 6,341,345 | B1 | 1/2002 | Auslander et al. | |
| 6,578,193 | B1 | 6/2003 | Adams | |
| 6,611,796 | B1 * | 8/2003 | Natarajan | G06F 11/261 703/24 |
| 7,747,989 | B1 | 6/2010 | Kissell | |
| 2004/0215848 | A1 * | 10/2004 | Craddock | H04L 49/90 710/39 |
| 2004/0221173 | A1 * | 11/2004 | Moyer | G06F 13/4013 713/189 |
| 2006/0284745 | A1 * | 12/2006 | Cameron | G06F 17/2217 341/50 |
| 2007/0283139 | A1 | 12/2007 | Kato | |
| 2008/0040345 | A1 * | 2/2008 | Cameron | G06F 7/02 |
| 2008/0235415 | A1 | 9/2008 | Clark et al. | |
| 2009/0089540 | A1 * | 4/2009 | Hansen | G06F 9/30014 712/29 |
| 2011/0082999 | A1 * | 4/2011 | Lai | G06F 9/30025 711/201 |
| 2011/0154303 | A1 | 6/2011 | Rice | |
| 2011/0191569 | A1 * | 8/2011 | Ishikawa | G06F 9/30025 712/204 |
| 2011/0258422 | A1 * | 10/2011 | Sakugawa | G06F 9/4403 712/229 |
| 2012/0011490 | A1 * | 1/2012 | Mizuno | G06F 9/4552 717/127 |
| 2013/0205154 | A1 * | 8/2013 | Freibert | G06F 1/14 713/323 |

OTHER PUBLICATIONS

Shen et al., "Native Simulation of MPSoC Using Hardware-Assisted Virtualization", Computer-Aided Design of Integrated Circuits and Systems, IEEE Transactions on 31, No. 7 (2012): 1074-1087.

* cited by examiner

VIRTUALIZATION IN A BI-ENDIAN-MODE PROCESSOR ARCHITECTURE

BACKGROUND

The present application relates generally to data processing, and more specifically, to processor architecture. Binary data is organized in memory as 8-bit units called "bytes," while the registers implemented by a processor may be larger than a single byte. The term "endian" refers to how bytes of a multi-byte element are ordered within memory as data is moved between registers and memory.

Individual bytes of a multi-byte element are generally stored in consecutive memory addresses (e.g., 4 consecutive addresses for a 32-bit element). A big-endian processor stores the most significant byte of the multi-byte element in the lowest address of the consecutive range, and stores the least significant byte in the highest address. In contrast, a little-endian processor stores the least significant byte in the lowest address. Put another way, bytes of increasing numeric significance are stored to increasing memory addresses by a little-endian processor, while a big-endian processor stores decreasing numeric significance with increasing memory addresses.

Consider, as an example, the 4-byte element "0A 0B 0C 0D" and a memory range with offsets 0-3. A big endian processor places the first byte ("0A") in offset 0, the second byte ("0B") in offset 1, the third byte ("0C") in offset 2, and the last byte ("0D") in the last offset, 3. A little-endian processor uses the reversed order, placing the first byte ("0A") in offset 3, the second byte ("0B") in offset 2, the third byte ("0C") in offset 1, and the last byte ("0D") in the first offset, 0.

A further complication arises in processing vectors of multi-byte elements. A 128-bit vector could contain a set of eight 2-byte halfwords, or a set of four 4-byte words, or a set of two 8-byte doublewords, or even any combination of these elements that add up to a total of a quadword (128-bits) in length. A vector of eight halfwords, four words, or two doublewords can all be loaded using the same load vector instruction, which loads a quadword. A big-endian processor would most efficiently load the vector as a monolithic quadword in big-endian byte-ordering, having the effect that vector element 0 would be placed into the leftmost element of the target vector register. On the other hand, a little-endian processor would most efficiently load the vector as a monolithic quadword in little-endian byte-ordering, having the effect that vector element 0 would be placed into the rightmost element of the target vector register.

As such, big-endian processors will define vector instructions that process vector data assuming vector elements are mapped in the vector register in left-to-right order. Likewise, little-endian processors will define vector instructions that process vector data assuming vector elements are mapped in the vector register in right-to-left order.

Even if a processor supporting both endian modes handles the byte-ordering differences between big-endian and little-endian data, a different problem arises with a class of vector instructions that process vector data and are sensitive to the ordering of the vector elements in the vector registers. Such element-ordering-sensitive vector instructions include (but are not limited to) element permute operations, element extract operations, element insert operations, pack operations, unpack operations, multiply even/odd operations, some cryptographic operations, string operations, encoding operations, decoding operations, and scalar operations. When pairs of vector registers are concatenated to form a double-wide source operand, these operations can be sensitive to the order of these vector registers (i.e., which is concatenated on the left and which on the right).

Such element-ordering-sensitive instructions as implemented on a big-endian processor will not be capable of correctly processing vectors that are loaded using little-endian byte-ordering. Likewise, element-ordering-sensitive instructions as implemented on a little-endian processor will not be capable of correctly processing vectors loaded using big-endian byte-ordering.

SUMMARY

One embodiment disclosed herein is a computer system for processing vectors. This system comprises a memory, and a processor that includes a plurality of registers. Each of the registers includes a plurality of elements. The computer system is configured to perform a method. This method comprises obtaining, by the processor, an instruction specifying an operation. The instruction further specifies one of the registers as a source register and one of the registers as a destination register. The processor obtains an endian mode and determines that the instruction is an element-ordering-sensitive instruction. Based on the determination that the instruction is an element-ordering-sensitive instruction, the processor executes the instruction by performing the operation on the elements of the source register in accordance with the endian mode and writing a result of the operation to the destination register.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
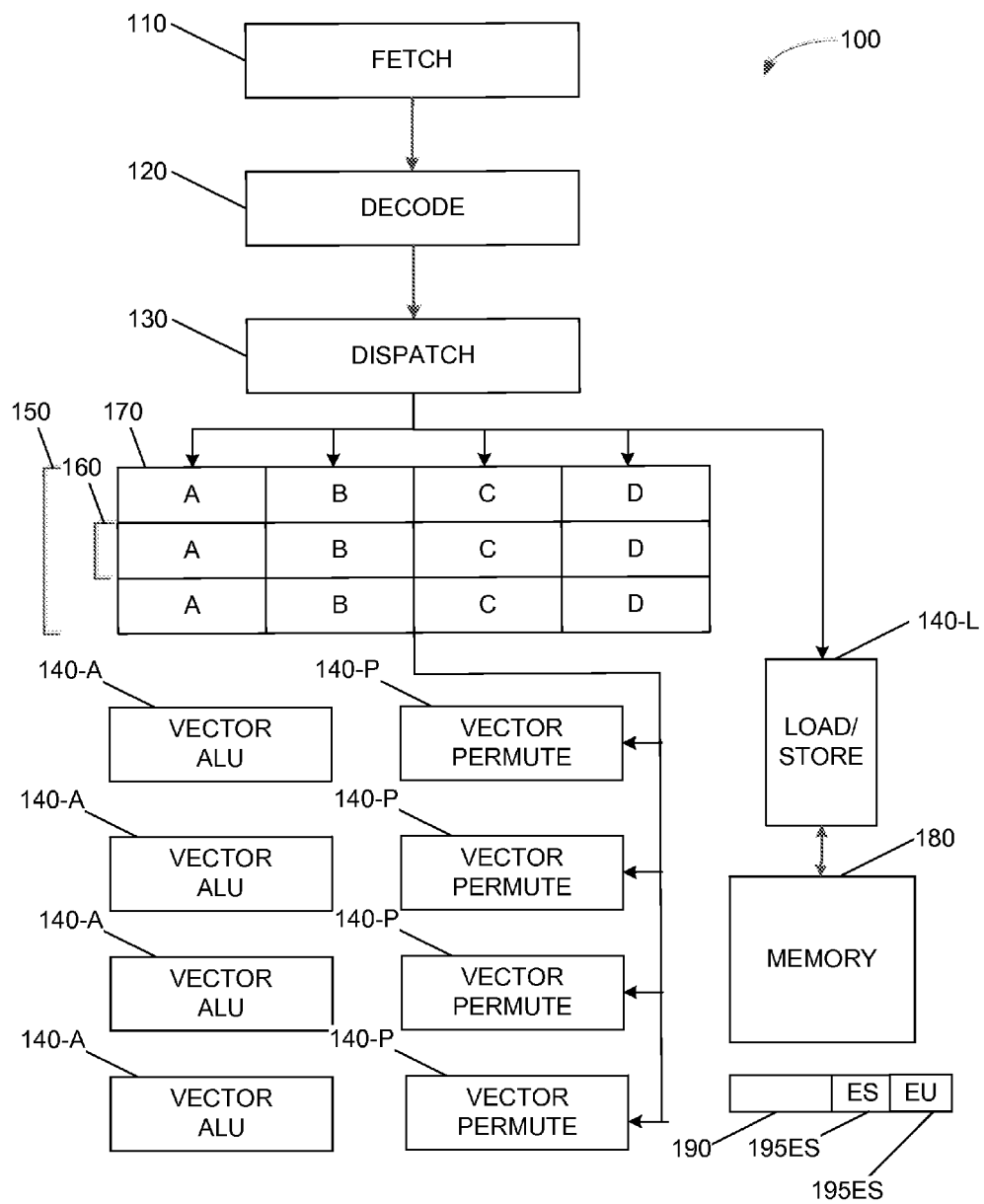
FIG. 1 depicts a block diagram of a vector processor in accordance with an embodiment.

A single instruction, multiple data (SIMD) processor uses a single instruction to perform the same operation on different data values. Multiple instances of the same type of functional unit are used so that the operation is performed on all of the data values simultaneously. Together, these data values can be viewed as a vector, so the SIMD processor is referred to herein as a "vector processor" and the individual data values are referred to herein as "vector elements."

Embodiments described herein provide inventive techniques for a vector processor that is bi-endian (i.e., supports both big-endian and little-endian modes) to use a single programming model (i.e., register view) for both endian modes while the processor circuitry implements mirrored element ordering. In other words, the instruction set architecture presents a single, big-endian perspective for both big-endian and little-endian modes, but the processor lays out the data in vector registers in right-to-left order (i.e., mirrored) when the processor is in little-endian mode.

One such embodiment of a vector processor makes endian information available to particular vector instructions and modifies the execution of these instructions to be adaptive to this endian information. In some embodiments, the endian information includes a bit that is controllable from user-level; in some embodiments, the endian information includes a bit that is controllable from supervisor-level; and in some embodiments, the endian information includes both such bits.

Most vector instructions are intra-element, i.e., the result of the operation of any particular element i is not affected by any of the remaining elements in the source vectors. Most vector instructions are also element-ordering-agnostic, i.e., any element's result is not affected by its respective element position in the vector (e.g., position i as compared to position j). Examples of intra-element and element-ordering-agnostic instructions include basic operations such as vector ADD, vector SUBTRACT, AND, OR, NOT, etc.

Some vector instructions are inter-element and element-ordering-agnostic. That is, the result of the operation of element i is affected by other elements in the vector but is not affected by its position in the vector. Examples of inter-element, element-ordering-agnostic instructions include "sum across" operations that are performed on individual vector elements, referenced from one particular side (left/right) of the vector register.

Some vector instructions are inter-element and element-ordering-sensitive, such that the result of an operation on a particular element is affected by its position in the vector. Examples of element-ordering sensitive instructions include: pack/unpack operations; merge operations; varieties of permute operations; cryptography operations such as permute combined with exclusive-or, and other cryptography operations including those specified by the Advanced Encryption Standard (AES); string-class operations such as a search; multiply odd elements; and multiple even elements.

For example, processing AES encrypted data using the AES Inverse Cipher instruction (vncipher) requires the data to first be loaded into a register from memory before vncipher can operate on it. One example of code to accomplish this is shown below:

| lxvx     | vSRC,rA,rB      |
| vncipher | vRESULT,vSRC    |
| stxvx    | vRESULT,rA,rB   |

In a conventional processor design the encrypted data is loaded from memory in little-endian byte order (that is, right-to-left) and the AES instruction is implemented to support data only in big-endian byte order. Additional instructions are required with this conventional design, to first byte-reverse the data loaded from memory so that it is in the big-endian byte order that vncipher was implemented to operate on, and to byte-reverse the result to little-endian byte ordering before storing the result. One example of code to accomplish this AES with byte reversal is shown below:

| lxvx     | vSRC,rA,rB       |
| xxbrq    | vSRC,vSRC        |
| vncipher | vRESULT,vSRC     |
| xxbrq    | vRESULT, vRESULT |
| stxvx    | vRESULT,rA,rB    |

Exacerbating the problem is that the above code works only for little-endian mode. When the conventional processor design is used, software must support two separate forms of code, one for big-endian and one for little-endian.

An endian-mode-sensitive vncipher as disclosed herein avoids the need to pre- and post-byte-reverse the data for little-endian, so software can utilize on a single code supporting both big-endian and little-endian modes. One example of code to accomplish this AES without byte reversal is shown below:

| lxvx     | vSRC,rA,rB      |
| vncipher | vRESULT,vSRC    |
| stxvx    | vRESULT,rA,rB   |

Scalar instructions implemented in a vector processor are intra-element and element-ordering-sensitive. While scalar instructions only operate within a single element of the vector and scalar results are not affected by any other element, scalar results are affected by the position in the vector the scalar instruction is executed in. Traditionally, it is desirable for scalar instructions to operate on data from element 0 of a vector. As such, when elements are ordered left-to-right for big-endian mode, a scalar instruction should be performed on vector data extracted from the leftmost element, corresponding to vector element 0; and when elements are ordered right-to-left for little-endian mode, a scalar instruction should be performed on vector data extracted from the rightmost element corresponding to vector element 0.

As noted above, embodiments of a vector processor disclosed herein make endian-mode adaptive endian information available to some vector instructions and modify the execution of these instructions to be adaptive to this endian information. More specifically, this endian-mode awareness and adaptation is applied to a class of vector instructions that are element-ordering-sensitive. When these instructions are executed by embodiments of a vector processor as disclosed herein, vector register elements are indexed from the rightmost element when the processor is in little-endian mode, and from the leftmost element when the processor mode is in big-endian mode. A non-limiting list of the inter-element and element-ordering sensitive instructions includes: vector permute; vector splat; vector extract; vector insert; vector AES cipher; vector AES inverse cipher; vector permute-with-exclusive-or; vector multiply even elements; vector multiple odd elements; load string with length; store string with length; and find index of leftmost non-matching element.

The set of element-ordering-sensitive instructions that are adaptively executed by the vector processor may be predefined in the processor circuitry. Similarly, embodiments of a vector processor disclosed herein also make endian-mode adaptive endian information available to scalar instructions that are executed by the vector processor and modify the execution of these instructions to be adaptive to this endian information. In at least one embodiment, a vector processor is a processor that operates on a sequence of distinct data elements with respect to a source program stored in a single register, regardless of the type of register file used to store operands or execution units used to perform said operations.

Referring to FIG. 1, a block diagram of a vector processor is generally shown. During operation of the vector processor 100, instructions are fetched by an instruction fetch unit 110 and supplied to an instruction decode unit 120. Decoded instructions are passed to a dispatch unit 130. The dispatch unit 130 causes each instruction to be executed by providing control signals and data to an appropriate one or more of the execution units 140 of the vector processor 100. In doing so, the dispatch unit 130 may resolve branch instructions and store non-branch instructions until ready for execution. The dispatch unit 130 is sometimes referred to as an "issue/branch unit." In some embodiments, the dispatch unit 130 contains prediction logic, instruction reordering logic, issue buffers, and/or other logic to implement instruction dispatch.

When an instruction references a register, the dispatch unit 130 accesses a register file before supplying the instruction to an appropriate one or more of the execution units 140. The vector processor 100 includes a vector register file 150, which is a collection of individual vector registers 160. Other embodiments may include an integer register file or a floating point register file. Some embodiments share register files (e.g., a combined integer and floating point register file), and additional register files may be present (e.g., a condition or predicate register file for comparison results).

A vector register 160 stores structured data, so each vector register 160 is partitioned into S elements 170, each storing a single field of the structured data. For example, a 128-bit vector register file can be partitioned into sixteen 8-bit byte elements, eight 16-bit half-word elements, four 32-bit word elements, two 64-bit doubleword elements, or one 128-bit element. The vector processor 100 performs vector processing by providing each one of the vector register elements 170 to an instance of a vector execution unit 140. The vector processor 100 shown in FIG. 1 includes vector arithmetic logic units 140-A and vector permute units 140-P.

Some vector instructions perform an operation that involves one or more registers, in which case appropriate vector execution unit(s) 140 receive data from elements 170 in vector registers 150. Some vector instructions access memory 180, in which case the dispatch unit 130 provides these memory access instructions to a load/store unit 140-L. The load/store unit 140-L may implement a load instruction which copies from memory 180 to one of the vector registers 160 and a store instruction which copies from one of the vector registers 160 to memory 180.

The vector processor 100 includes a machine state register 190 that controls the endian-mode of the processor. In the example embodiment of FIG. 1, the endian-mode is controlled by an endian-mode field 195-ES that is accessible in supervisor mode and by an endian-mode field 195-EU that is accessible in user mode. Other embodiments support only the supervisor endian-mode field 195-ES.

While the description herein focuses on vector instructions, vector registers 160, and vector execution units 140, persons of ordinary skill in the art should appreciate that the vector processor 100 may also handle integers, and fixed or floating point numbers, and may thus include corresponding register files and logic units which will not be discussed further.

Figure 2:
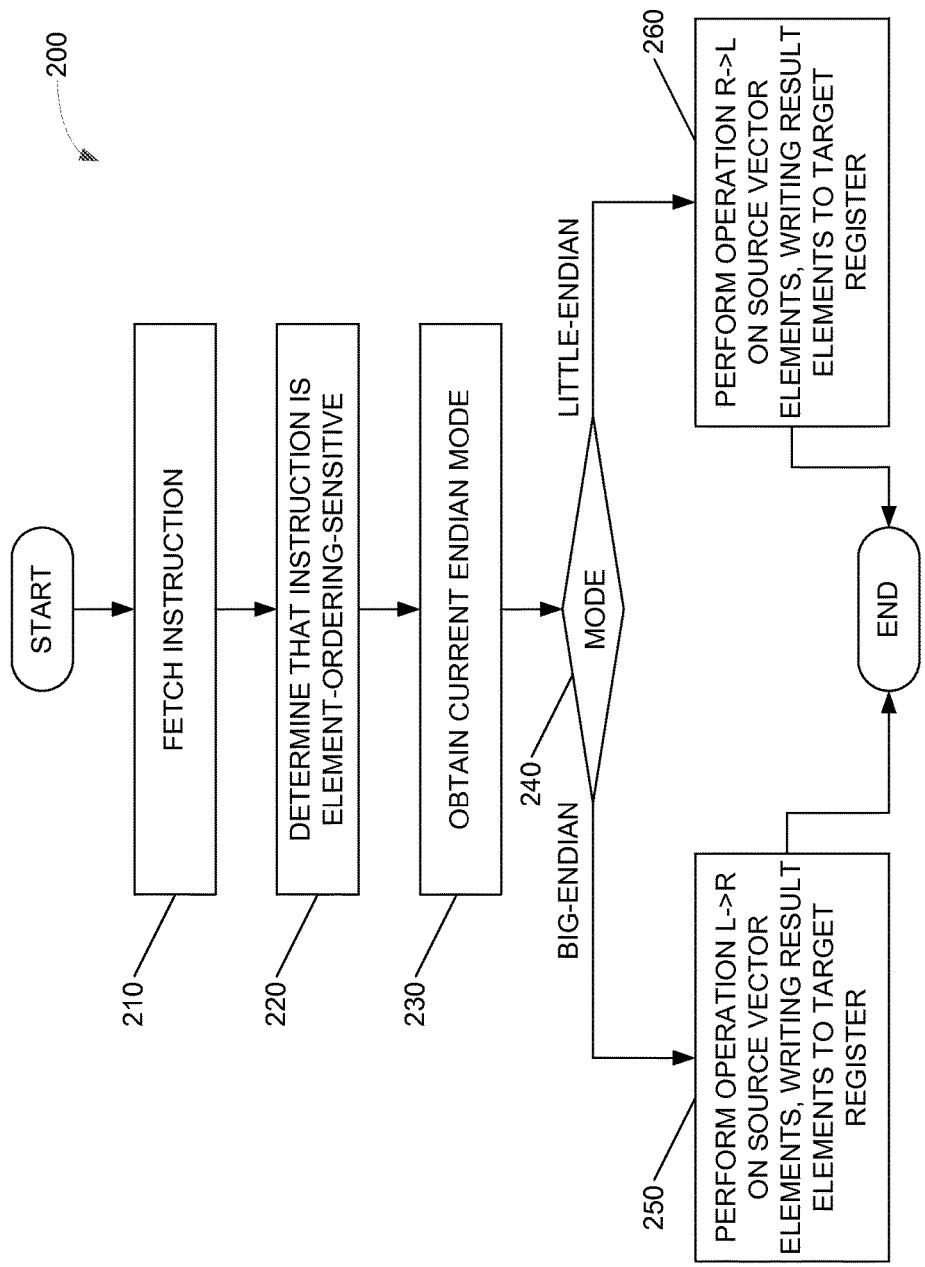
FIG. 2 depicts a process flow for adaptive endian-mode execution of a vector instruction in accordance with an embodiment.

Referring to FIG. 2, a process flow is shown for adaptive endian-mode execution of a vector instruction, in accordance with an embodiment of the vector processor 100. The process 200 begins at block 210, where a vector instruction is fetched, or obtained, from memory. Persons of ordinary skill in the art should appreciate that instructions may be stored in the same memory as data, or in different memory, and may be stored in main memory or cache memory.

At block 220, the vector processor 100 determines that the fetched instruction is an element-ordering-sensitive instruction. This determination may be made by examining a predefined table or list of such instructions.

At block 230, the vector processor 100 obtains a current endian mode, for example, by reading one of the endian mode bits 195-ES, 195-EU, or a combination thereof.

As described earlier, these vector instructions specify a source vector register, a target vector register, and an operation to be performed on each element of the source, where the result of the operation is stored in the target. Having determined that the instruction is appropriate for endian-mode adaptive processing and having obtained the current endian-mode, the vector processor 100 checks the current endian-mode at block 220, then continues processing at block 230 if the processor is in big-endian mode. The vector processor 100 continues at block 240 instead if the processor is in little-endian mode.

At block 230, having determined that the current endian mode is big-endian, the vector processor 100 performs the operation specified by the vector instruction starting with the leftmost element in the source vector register, moving sequentially left-to-right and completing with the rightmost element. As the operation proceeds from element to element, the result is written to the corresponding element of the target vector register. Once the operation has been performed on the rightmost element and the rightmost element of the target has been written, execution of the instruction is complete.

If, on the other hand, it is determined block 220 that the current endian mode is little-endian, then at block 240 the vector processor 100 performs the operation specified by the vector instruction starting with the rightmost element in the source vector register, moving sequentially right-to-left and completing with the leftmost element. As the operation proceeds from element to element, the result is written to the corresponding element of the target vector register. Once the operation has been performed on the leftmost element and the leftmost element of the target has been written, execution of the instruction is complete.

As described above, when performing an operation on a vector element, the contents of the element are provided to a vector execution unit. In some embodiments, when providing the source register elements to the execution unit, the vector processor 100 inverts all significant bits of the source register elements when the mode is little-endian and leaves the bits unmodified when the mode is big-endian.

Some vector instructions may include explicit references to particular elements, for example, by index i. In some embodiments, the vector processor 100 modifies these explicit references to take into account the endian mode.

Figure 3:
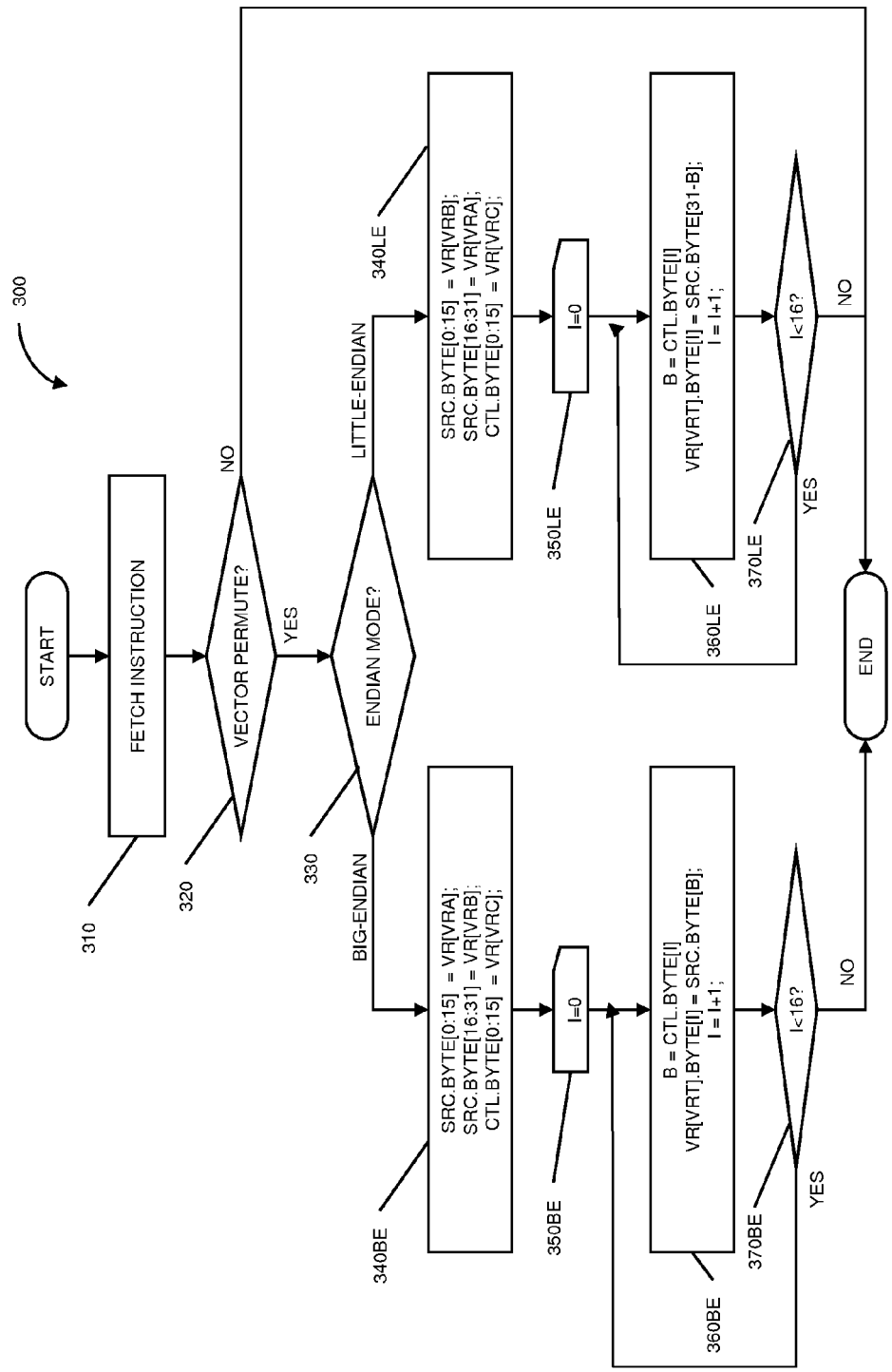
FIG. 3 depicts a process flow for executing a vector permute instruction in accordance with an embodiment.

Referring to FIG. 3, a process flow is shown for executing a vector permute instruction, in accordance with an embodiment of the vector processor 100. In this example embodiment, the vector permute instruction uses the syntax vperm (VRT, VRA, VRB, VRC) and the following instruction format:

| 0 | 6 | 11 | 16 | 21 | 31 |
|---|---|----|----|----|----|
| 4 | VRT | VRA | VRB | VRC | 43 | where: the VRA and VRB instruction fields specify two vector registers in the vector register file 150, whose contents are concatenated to form a double-wide source vector operand; the VRC instruction field specifies a vector register in the vector register file 150 used as a permute control vector operand; and the VRT instruction field specifies a vector register in the vector register file 150 that receives the result of the permute instruction.

The process 300 begins at block 310, where the next instruction is fetched, or obtained, from memory. Persons of ordinary skill in the art should appreciate that instructions may be stored in the same memory as data, or in different memory, and may be stored in main memory or cache memory. Next, at block 320, the vector processor 100 examines the opcode field(s) in the fetched instruction and determines that the instruction corresponds to a vector permute instruction (vperm).

At block 330, having determined the instruction is a vector permute and is therefore element-ordering-sensitive, the vector processor 100 determines whether the vector instruction fetched at block 310 specifies big-endian byte ordering or little-endian byte ordering by examining the endian-mode field 195-ES or 195-EU in the machine state register 190. If the endian mode is specified as big-endian byte ordering, then processing continues at block 340BE. If the endian mode is specified as little-endian byte ordering, then processing continues at block 340LE.

At block 340BE, having determined that the instruction is a vector permute instruction, and is therefore element-ordering-sensitive, and that the endian mode is big-endian byte ordering, the vector processor 100 obtains two source quadwords (128 bits each) by using the VRA and VRB instruction fields as indices into the vector register file 150. The source vector is the concatenation of the contents of VR[VRA] followed by the contents of VR[VRB]. The vector processor 100 obtains the permute control vector by using the VRC instruction field as an index into the vector register file 150. The permute control vector is the contents of VR[VRC].

At blocks 350BE, 360BE, and 370BE, the vector processor 100 performs the permute operation and stores the result in the target vector register as follows:

```
do i=0 to 15;
    b <= VR[VRC].byte[i].bit[3:7]
    VR[VRT].byte[i] <= src.byte[b]   // src byte element is indexed from left
end
```

At block 340LE, having determined that the instruction is a vector permute instruction, therefore element-ordering-sensitive, and the endian mode is little-endian byte ordering, the vector processor 100 obtains two source quadwords (128 bits each) by using the VRA and VRB instruction fields as indices into the vector register file 150. The source vector is the concatenation of the contents of VR[VRB] followed by the contents of VR[VRA]. The vector processor 100 obtains the permute control vector by using the VRC instruction field as an index into the vector register file 150. The permute control vector is the contents of VR[VRC].

At blocks 350LE, 360LE, and 370LE, the vector processor 100 performs the permute operation and stores the result in the target vector register. Pseudo code for this permute operation is shown below

```
do i=0 to 15;
    b <= VR[VRC].byte[i].bit[3:7]
    VR[VRT].byte[i] <= src.byte[31-b]   // src byte element is indexed from right
end
```

The embodiment of FIG. 3 illustrates a big-endian-based vector processor that supports both big-endian and little-endian vector data. A little-endian-based embodiment is also contemplated, where vector elements are indexed from the rightmost vector element.

Figure 4:
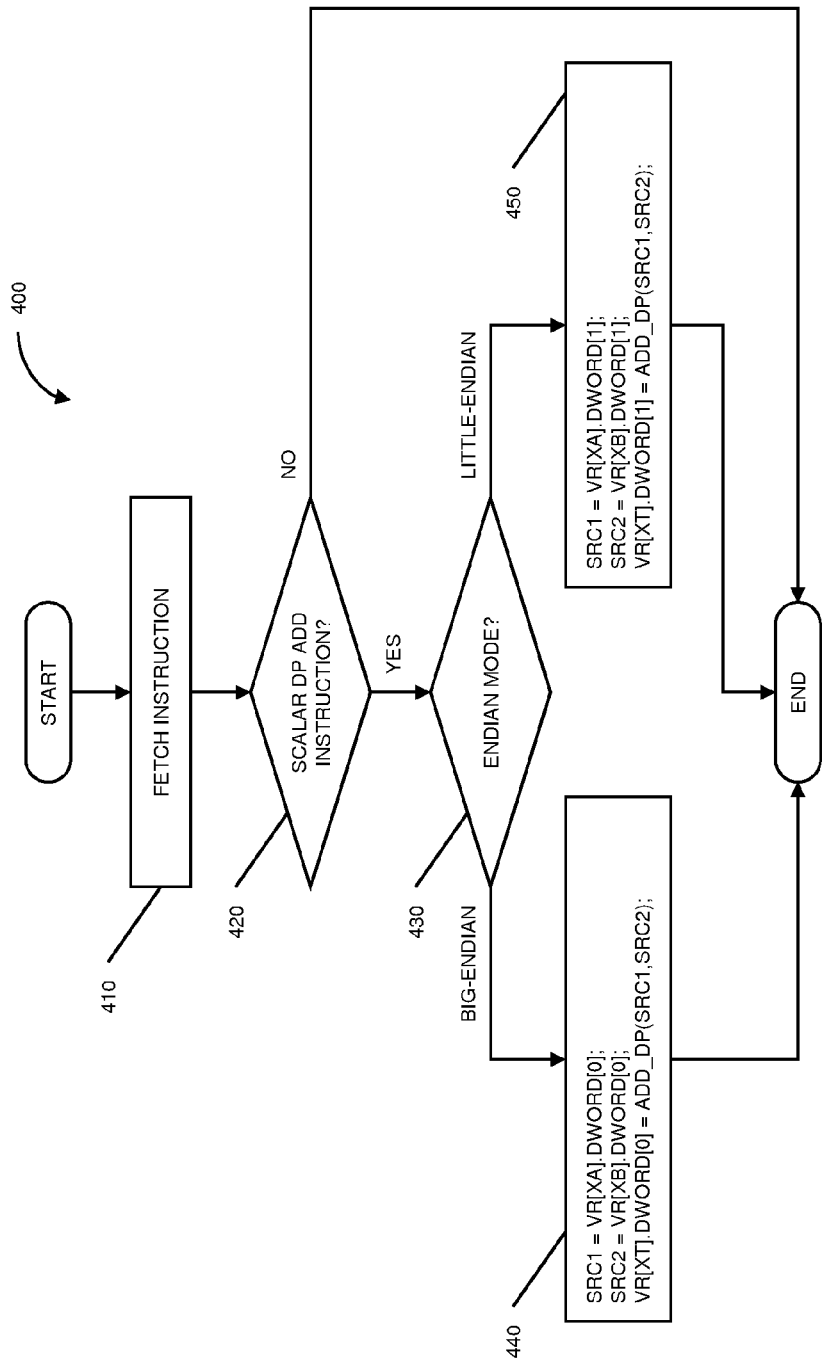
FIG. 4 depicts a process flow for executing a scalar instruction in accordance with an embodiment.

Referring to FIG. 4, a process flow is shown for executing a scalar double-precision floating-point add instruction, in accordance with an embodiment of the vector processor 100. In this example embodiment, the scalar add instruction uses the syntax xsadddp(XT, XA, XB) and the following instruction format:

| 0 | 6 | 11 | 16 | 21 | 29 | 30 | 31 |
|---|---|----|----|----|----|----|----|
| 60 | T | A | B | 32 | AX | BX | TX | where: the XA (AX‖A) and XB (BX‖B) instruction fields specify two vector registers in the vector register file 150 from which the scalar source operands are extracted; and the XT (TX‖T) instruction field specifies a vector register in the vector register file 150 that receives the result of the scalar add instruction.

The process 400 begins at block 410, where the next instruction is fetched, or obtained, from memory. Persons of ordinary skill in the art should appreciate that instructions may be stored in the same memory as data, or in different memory, and may be stored in main memory or cache memory. Next, at block 420, the vector processor 100 examines the opcode field(s) in the fetched instruction and determines that the instruction corresponds to a scalar double-precision floating-point add instruction (xsadddp).

At block 430, having determined the fetched instruction is a scalar double-precision floating-point add instruction and is thus element-ordering-sensitive, the vector processor 100 determines whether the vector instruction fetched at block 310 specifies big-endian byte ordering or little-endian byte ordering, by examining an endian-mode field 195-ES or 195-EU in the machine state register 190. If the endian mode is specified as big-endian byte ordering, then processing continues at block 440. If the endian mode is specified as little-endian byte ordering, then processing continues at block 450.

At block 440, having determined that the instruction endian mode is specified as big-endian byte ordering, the vector processor 100 obtains two scalar double-precision floating-point source operands (64 bits each) by using the XA (AX&A) and XB (BX&B) instruction fields as indices into the vector register file 150. The source operands are extracted from the leftmost doubleword element of VR[XA] and VR[XB]. The vector processor 100 performs the double-precision floating-point add operation and stores the result in the leftmost doubleword element in the target vector register.

At block 450, having determined that the instruction endian mode is specified as little-endian byte ordering, the vector processor 100 obtains two scalar double-precision floating-point source operands (64 bits each) by using the XA (AX&A) and XB (BX&B) instruction fields as indices into the vector register file 150. The source operands are extracted from the rightmost doubleword element of VR[XA] and VR[XB]. The vector processor 100 performs the double-precision floating-point add operation and stores the result in the rightmost doubleword element in the target vector register.

The example in FIG. 4 illustrates a big-endian-based embodiment that supports both big-endian and little-endian vector data. A little-endian-based embodiment is also contemplated, where vector elements are indexed from the rightmost vector element.

Figure 5:
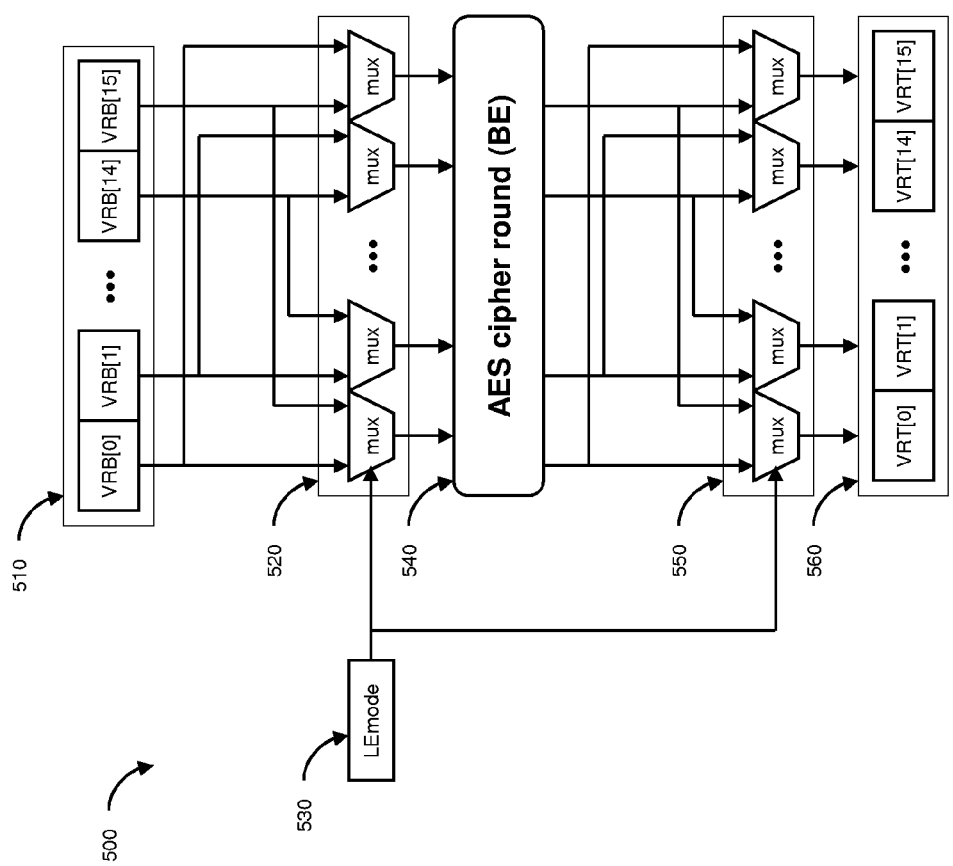
FIG. 5 depicts adaptive endian-mode execution of a vector AES cipher instruction in accordance with an embodiment.

Referring to FIG. 5, one embodiment of an adaptive endian-mode execution of a vector AES cipher instruction is shown. A register 510 contains the source vector VRB, containing sixteen 8-bit elements. A multiplexor 520 selects between the contents of the source vector 510 and the byte-reversed contents of the source vector 510, based on whether the endian mode indicator 530 is set for big-endian mode, in which case the contents of the source vector 510 are selected, or is set for little-endian mode, in which case the byte-reversed contents of the source vector 510 are selected.

The output of the multiplexor 520 is sent to the AES cipher round (BE) 540, which performs an AES cipher round, assuming the input data from the multiplexor 520 is presented in left-to-right byte order.

The result produced by the AES cipher round (BE) 540 is in left-to-right byte order, and is then sent to the multiplexor 550. The multiplexor 550 selects between the output of the AES cipher round 540 and the output of the AES cipher round 540 in byte-reversed order, based on whether the endian mode indicator 530 is set for big-endian mode, in which case the output of the AES cipher round 540 is selected, or is set for little-endian mode, in which case the byte-reversed output of the AES cipher round 540 is selected. The output of the multiplexor 550 is written into the target register 560.

In another embodiment, the AES unit is implemented as a little-endian processing unit, and big-endian processing is in turn implemented by byte reversing big-endian input and output operands in accordance with the present invention.

Figure 6:
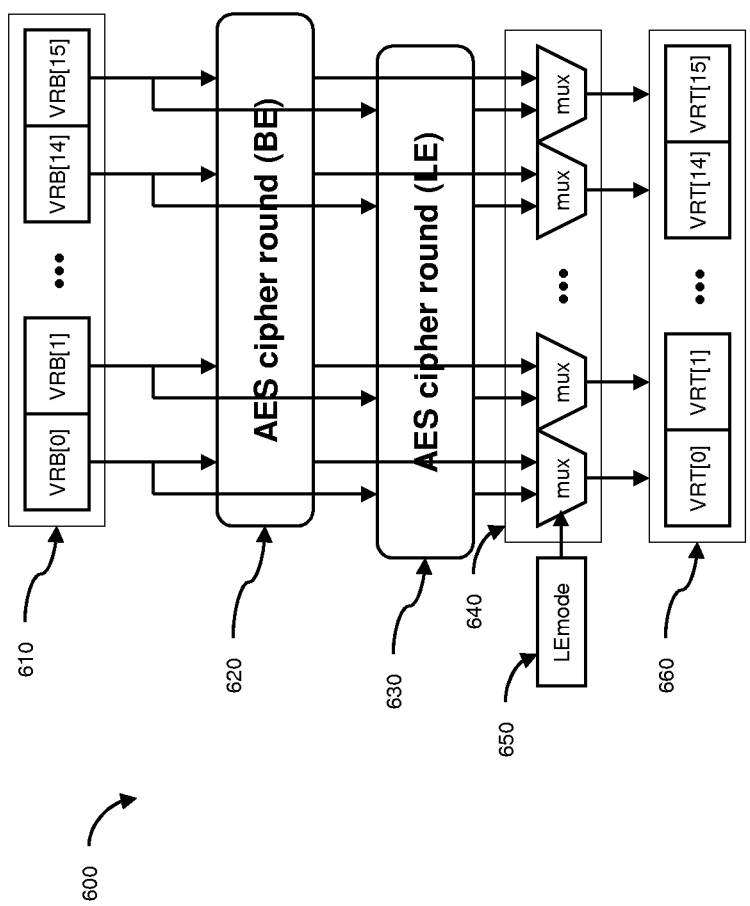
FIG. 6 depicts adaptive endian-mode execution of a vector AES cipher instruction in accordance with another embodiment.

Referring to FIG. 6, another embodiment of an adaptive endian-mode execution of a vector AES cipher instruction is shown. A register 610 contains the source vector VRB, containing sixteen 8-bit elements. The contents of register 610 are sent to the AES cipher round (BE) block 620 and to the AES cipher round (LE) block 630.

The AES cipher round (BE) 620 performs an AES cipher round assuming the data is in left-to-right byte order, and produces its result in left-to-right byte order.

The AES cipher round (LE) 630 performs an AES cipher round assuming the data is in right-to-left byte order, and produces its result in right-to-left byte order.

The outputs of AES cipher round (BE) 620 and AES cipher round (LE) 630 are presented to the multiplexor 640. The multiplexor 640 selects between the output of the AES cipher round (BE) 620 and the output of the AES cipher round (LE) 630, based on whether the endian mode indicator 640 is set for big-endian mode, in which case the output of the AES cipher round (BE) 620 is selected, or is set for little-endian mode, in which case the output of the AES cipher round (LE) 630 is selected. The output of the multiplexor 840 is written into the target register 850.

Figure 7:
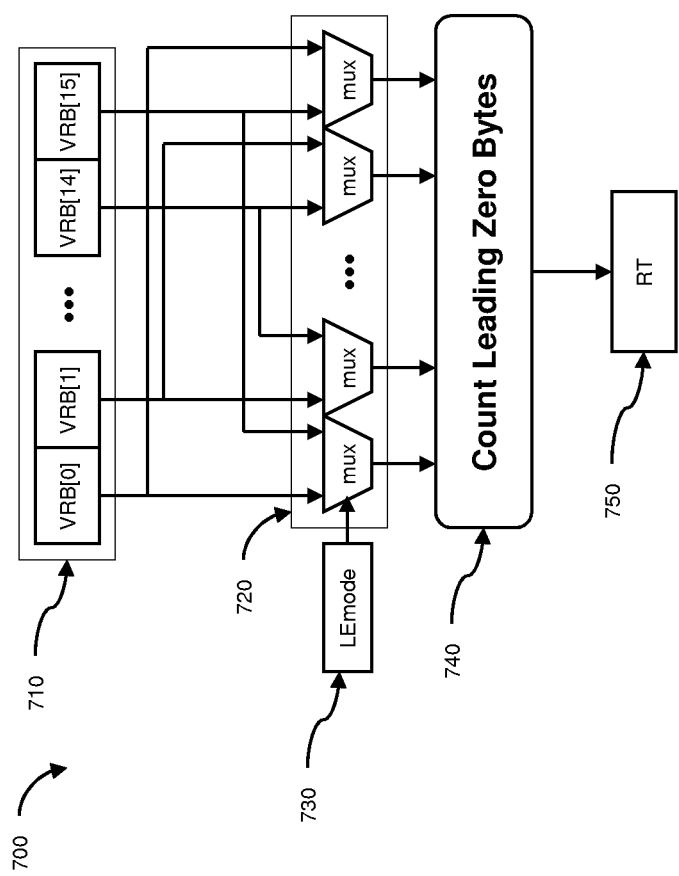
FIG. 7 depicts adaptive endian-mode execution of a vector count leading zero bytes instruction in accordance with an embodiment.

Referring to FIG. 7, one embodiment of an adaptive endian-mode execution of a vector count leading zero bytes instruction is shown. A register 710 contains the source vector VRB, containing sixteen 8-bit elements. A multiplexor 720 selects between the contents of the source vector 710 and the byte-reversed contents of the source vector 710, based on whether the endian mode indicator 730 is set for big-endian mode, in which case the contents of the source vector 710 are selected, or is set for little-endian mode, in which case the byte-reversed contents of the source vector 710 are selected.

The output of the multiplexor 720 is sent to the Count Leading Zero Bytes block 740. The Count Leading Zero Bytes block 740 scans the input left-to-right and produces a count of the number of contiguous bytes from the left that are equal to zero. The output of the Count Leading Zero Bytes block 740 is written into the target register 950.

In another embodiment, the Count Leading Zero Bytes unit is implemented as a little-endian processing unit, and big-endian processing is in turn implemented by byte reversing big-endian input operands in accordance with the present invention.

Figure 8:
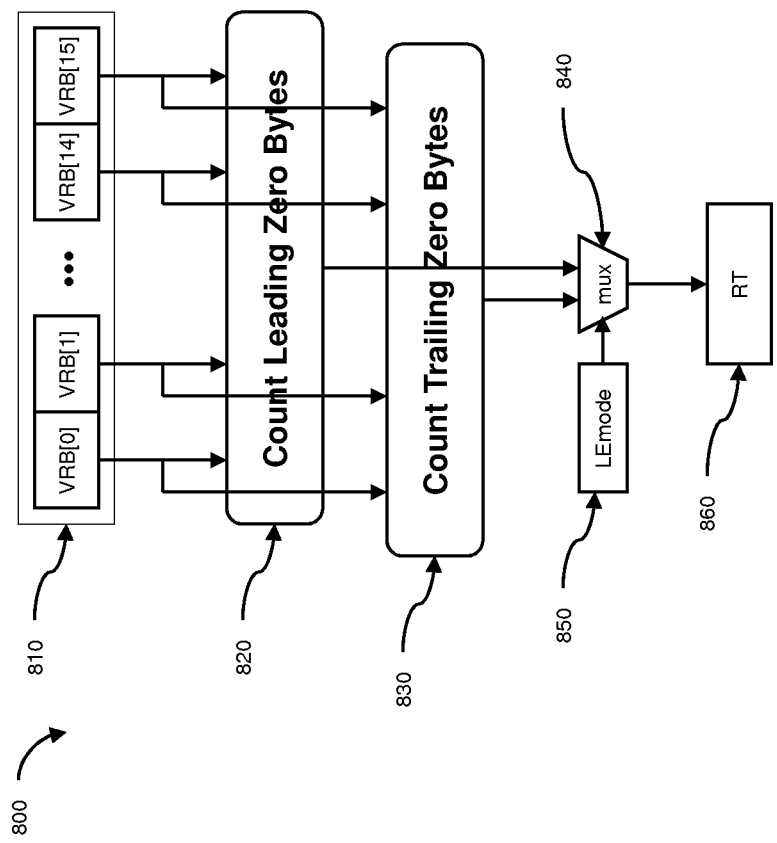
FIG. 8 depicts adaptive endian-mode execution of a vector count leading zero bytes instruction in accordance with another embodiment.

Referring to FIG. 8, another embodiment of an adaptive endian-mode execution of a vector count leading zero bytes instruction is shown. A register 810 contains the source vector VRB, containing sixteen 8-bit elements. The contents of register 810 are sent to the Count Leading Zero Bytes block 820 and to the Count Trailing Zero Bytes block 830.

The Count Leading Zero Bytes block 820 scans the input left-to-right and produces a count of the number of contiguous bytes from the left that are equal to 0. The Count Trailing Zero Bytes block 830 scans the input right-to-left and produces a count of the number of contiguous bytes from the right that are equal to 0.

The outputs of Count Leading Zero Bytes block 820 and Count Trailing Zero Bytes block 830 are presented to the multiplexor 840. The multiplexor 80 selects between the output of the Count Leading Zero Bytes block 820 and the output of the Count Trailing Zero Bytes block 830 based on whether the endian mode indicator 850 is set for big-endian mode, in which case the output of the Count Leading Zero Bytes block 820 is selected, or is set for little-endian mode, in which case the output of the Count Trailing Zero Bytes block 830 is selected. The output of the multiplexor 840 is written into the target register 850.

Figure 9:
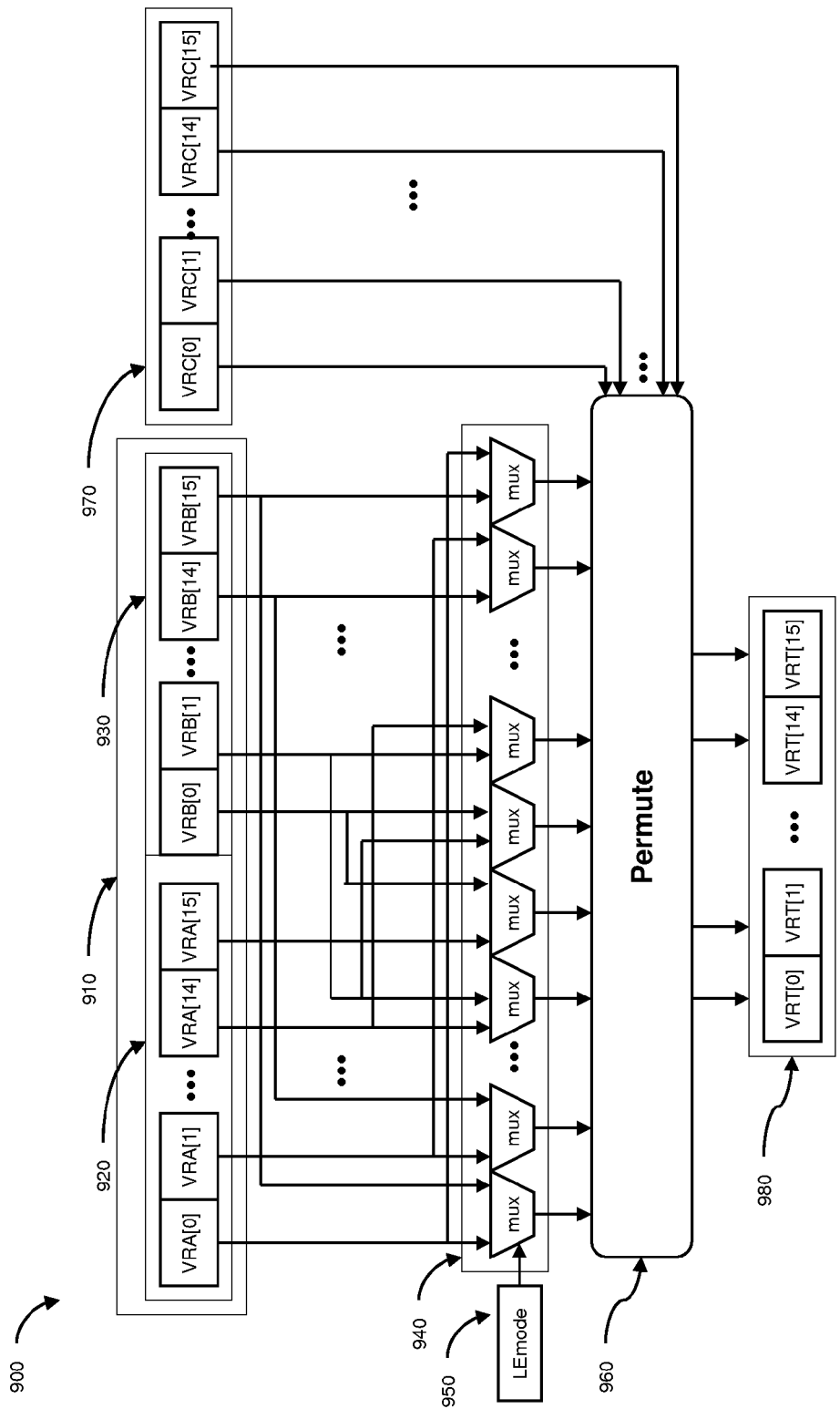
FIG. 9 depicts adaptive endian-mode execution of a vector permute instruction in accordance with an embodiment.

Referring to FIG. 9, one embodiment of an adaptive endian-mode execution of a vector permute instruction is shown. The source vector 910 contains the concatenation of vector registers VRA 920 and VRB 930, each containing sixteen 8-bit elements.

A multiplexor 940 selects between the contents of the 32-byte source vector 910 and the byte-reversed contents of the source vector 910, based on whether the endian mode indicator 950 is set for big-endian mode, in which case the contents of the source vector 910 are selected, or is set for little-endian mode, in which case the byte-reversed contents of the source vector 910 are selected. The output of the multiplexor 940 is sent to the Permute block 960.

The Permute block 960 produces sixteen 8-bit elements as its result. Each 8-bit element of the output of the Permute block 960 is extracted from one of the 32 bytes received from the multiplexor 940 as indexed by the corresponding 8-bit element received from the permute control vector (VRC) 970. The output of the Permute block 960 is written into the target register 980.

In another embodiment, the permute unit is implemented as a little-endian processing unit, and big-endian processing is in turn implemented by byte reversing big-endian input in accordance with the present invention.

Figure 10:
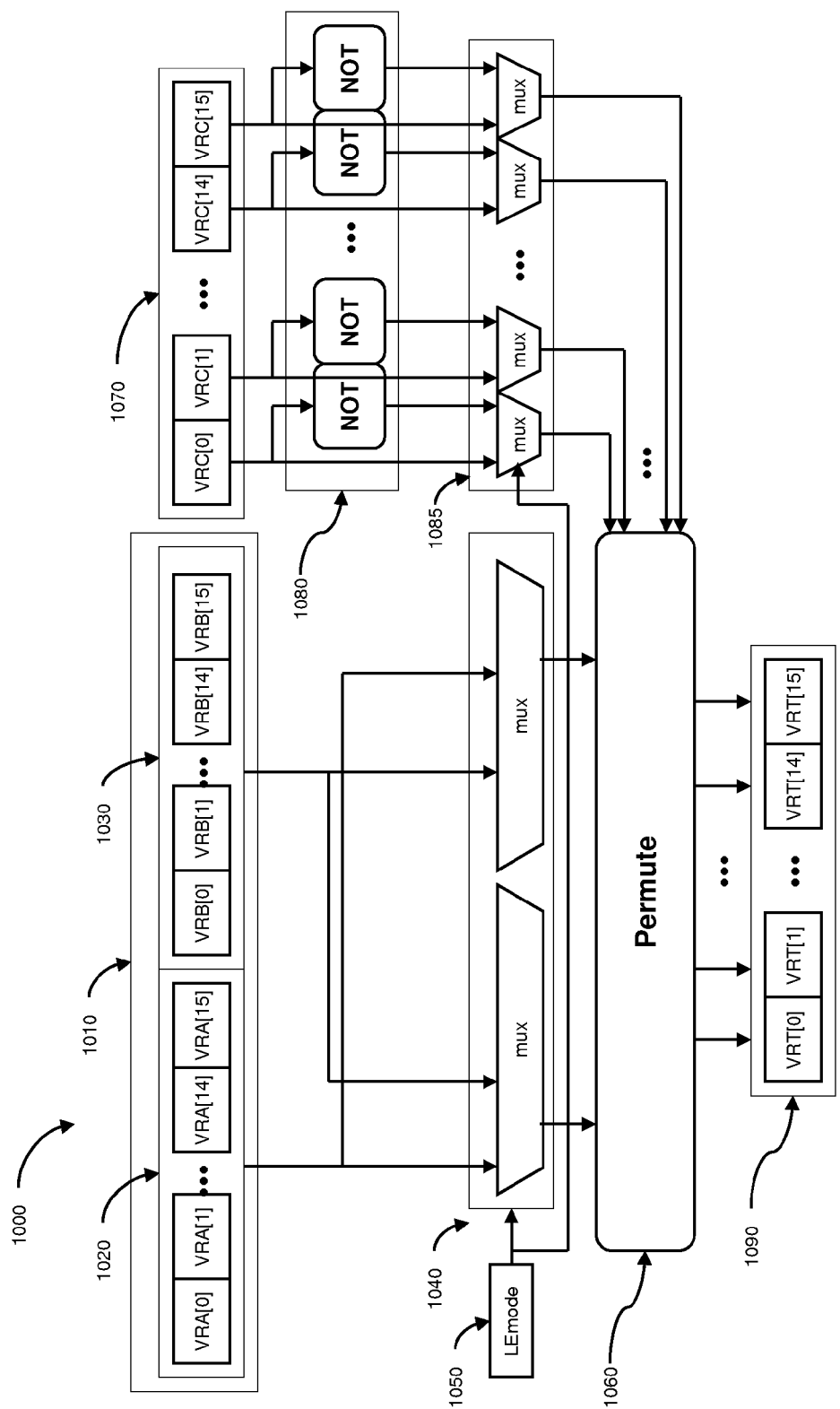
FIG. 10 depicts adaptive endian-mode execution of a vector permute instruction in accordance with another embodiment.

Referring to FIG. 10, another embodiment of an adaptive endian-mode execution of a vector permute instruction is shown. The source vector 1010 contains the concatenation of vector registers VRA 1020 and VRB 1030, each containing sixteen 8-bit elements.

A multiplexor 1040 selects between the contents of the 32-byte source vector 1010 and the quadword-reversed contents of the 32-byte source vector 1010, based on whether the endian mode indicator 1050 is set for big-endian mode, in which case the contents of the 32-byte source vector 1010 are selected, or is set for little-endian mode, in which case the quadword-reversed contents of the 32-byte source vector 1010 are selected. The output of the multiplexor 1040 is sent to the Permute block 1060.

The permute control vector (VRC) 1070 contains sixteen 8-bit elements. The contents of the permute control vector VRC 1070 are complemented by the logical NOT circuits in block 1080, thereby renumbering elements from a first endian order to a second endian order. Both the contents of the permute control vector VRC 1070 and its complemented value from block 1080 are sent to the multiplexor 1085.

The multiplexor 1085 selects between the contents of the permute control vector VRC 1070 and its complemented value from block 1080 based on the setting of the endian mode indicator 1050. When the endian mode indicator 1050 is set to big-endian mode, the multiplexor 1085 selects the contents of the permute control vector VRC 1070, where each 8-bit element provides an element index to be referenced from the leftmost element of the source vector 1010. When the endian mode indicator 1050 is set to little-endian mode, the multiplexor 1085 selects the complemented value from block 1080. Complementing the value has the effect of converting an index from the leftmost element to an index from the rightmost element, achieving the same effect as a byte-reverse of the source vector 1010. The output of the multiplexor 1285 is sent to the Permute block 1260.

The Permute block 1060 produces sixteen 8-bit elements as its result. Each 8-bit element of the output of the Permute block 1060 is extracted from one of the 32 bytes received from the multiplexor 1040 as indexed by the corresponding 8-bit element received from the multiplexor 1085. The output of the Permute block 1060 is written into the target register 1090.

In another embodiment, block 1280 complements only the low order bits corresponding to element positions within each input register, but not the bit positions corresponding to the selection between at least a first and a second input register, thereby obviating the need for inverting operands to permute unit 1060.

In another embodiment, the permute unit is implemented as a little-endian processing unit, and big-endian processing is in turn implemented by renumbering big endian element indicators.

In accordance with yet another instruction, vector processor 100 implements an instruction that finds a single occurrence of an element in a vector operand and returns an element position corresponding to a current endian mode defined for the program. One embodiment implements the instruction according to the pseudo code shown below:

```
receive input operands: GPRA, VSRB
hit = FALSE
multi_hit = FALSE
for (i=0 to 15)   ;search an element corresponding to GPRA in elements
of VSRB
    if VSRB[i] = GPRA
        then
            IF hit
                            multi_hit = TRUE
            result = i ; hit = TRUE
if multi_hit
    perform error indication
if (endian mode = big endian)
    GPRC = result           ; return result of processing circuit
else ; endian mode is LE mode
    GPRC = 15 − result      ; return modified result of processing circuit
```

In at least one embodiment, the endian mode for the program is defined by a control register, a program status word (PSW) register, a machine state register (MSR), or a special purpose register and is used to modify processing instructions as described herein.

The endian-mode aware adaptive processing for element-ordering-sensitive instructions may be implemented in a processor of a data processing system. Such a data processing system may have one or more processors in which each processor, or a subset of processors, may implement the embodiments described herein. The types of data processing systems that include vector processors in accordance with one or more illustrative embodiments may vary considerably, and thus, the present description cannot address each such possible processor architecture. However, for purposes of illustration, FIG. 11 is provided as an example of one type of data processing system in which the endian-mode adaptive instructions of one or more illustrative embodiments may be implemented.

Figure 11:
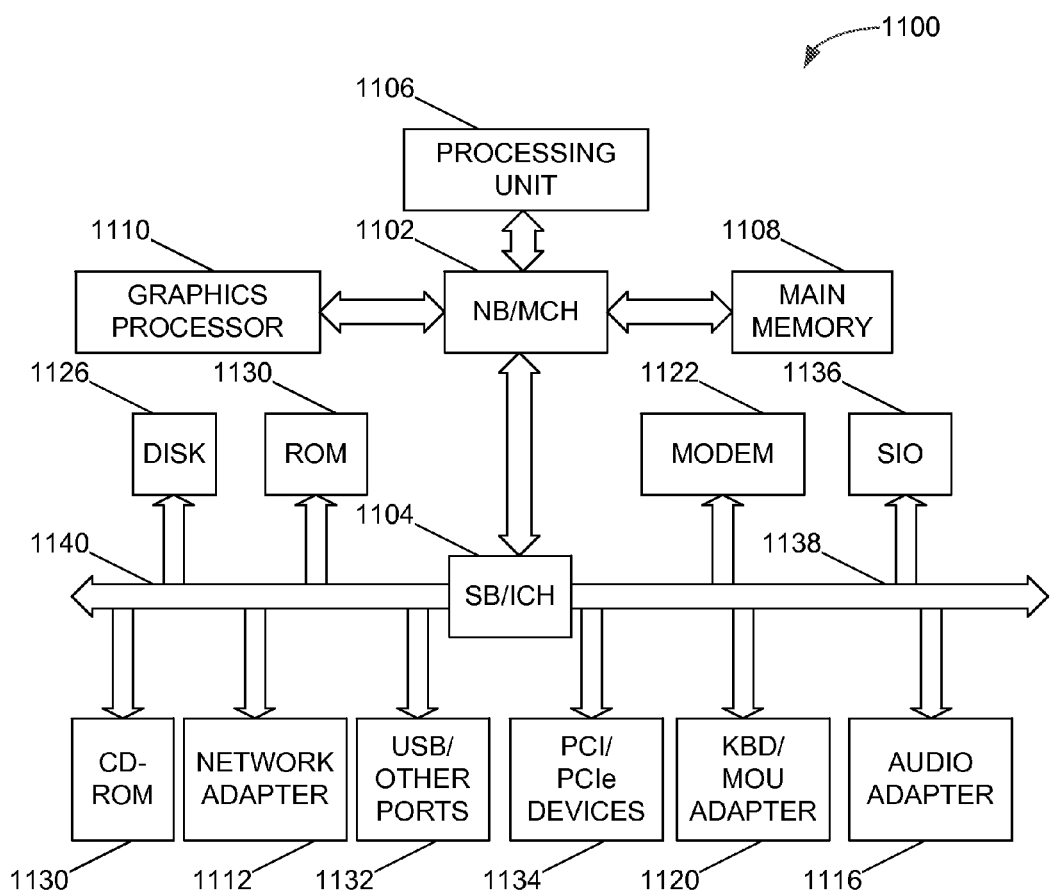
FIG. 11 depicts a block diagram of a data processing system in accordance with an embodiment.

Referring to FIG. 11, a block diagram of a data processing system is shown in which aspects of one or more illustrative embodiments may be implemented. Data processing system 1100 is an example of a computer, in which computer usable code or instructions implementing the processes for one or more embodiments disclosed herein may be located.

In the depicted example, data processing system 1100 employs a hub architecture including north bridge and memory controller hub (NB/MCH) 1102 and south bridge and input/output (I/O) controller hub (SB/ICH) 1104. Processing unit 1106, main memory 1108, and graphics processor 1110 are connected to NB/MCH 1102. Graphics processor 1110 may be connected to NB/MCH 1102 through an accelerated graphics port (AGP).

In the depicted example, local area network (LAN) adapter 1112 connects to SB/ICH 1104. Audio adapter 1116, keyboard and mouse adapter 1120, modem 1122, read only memory (ROM) 1124, hard disk drive (HDD) 1126, CD-ROM drive 1130, universal serial bus (USB) ports and other communication ports 1132, and PCI/PCIe devices 1134 connect to SB/ICH 1104 through bus 1138 and bus 1140. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 1126 and CD-ROM drive 1130 connect to SB/ICH 1104 through bus 1140. HDD 1126 and CD-ROM drive 1130 may use, for example, an integrated drive electronics (IDE)

or serial advanced technology attachment (SATA) interface. Super I/O (SIO) device 1136 may be connected to SB/ICH 1104.

An operating system runs on processing unit 1106. The operating system coordinates and provides control of various components within data processing system 1100 in FIG. 11. As a client, the operating system may be a commercially available operating system such as Microsoft® Windows® XP (Microsoft and Windows are trademarks of Microsoft Corporation in the United States, other countries, or both) or the Linux® operating system (Linux is a trademark of Linus Torvalds in the United States, other countries, or both). An object-oriented programming system, such as the Java™ programming system, may run in conjunction with the operating system and provides calls to the operating system from Java™ programs or applications executing on data processing system 1100 (Java is a trademark of Sun Microsystems, Inc. in the United States, other countries, or both).

As a server, data processing system 1100 may be, for example, an IBM® eServer™ System p® computer system, running the Advanced Interactive Executive (AIX®) operating system or the Linux® operating system (eServer, System p® and AIX are trademarks of International Business Machines Corporation in the United States, other countries, or both). Data processing system 1100 may be a symmetric multiprocessor (SMP) system including a plurality of processors, such as the POWER® processor available from International Business Machines Corporation of Armonk, N.Y., in processing unit 1106. Alternatively, a single processor system may be employed.

Instructions for the operating system, the object-oriented programming system, and applications or programs are located on storage devices, such as HDD 1126, and may be loaded into main memory 1108 for execution by processing unit 1106. The processes for one or more illustrative embodiments may be performed by processing unit 1106 using computer usable program code, which may be located in a memory, such as, for example, main memory 1108, ROM 1124, or in one or more peripheral devices 1126 and 1130, for example.

A bus system, such as bus 1138 or bus 1140, as shown in FIG. 11, may be comprised of one or more buses. Of course, the bus system may be implemented using any type of communication fabric or architecture that provides for a transfer of data between different components or devices attached to the fabric or architecture. A communication unit, such as modem 1122 or network adapter 1112 of FIG. 11, may include one or more devices used to transmit and receive data. A memory may be, for example, main memory 1108, ROM 1124, or a cache, such as found in NB/MCH 1102 in FIG. 11.

Those of ordinary skill in the art will appreciate that the hardware in FIG. 11 may vary depending on the implementation. Other internal hardware or peripheral devices, such as flash memory, equivalent non-volatile memory, or optical disk drives and the like, may be used in addition to or in place of the hardware depicted in FIG. 11. Also, the processes of one or more illustrative embodiments may be applied to a multiprocessor data processing system, other than the SMP system mentioned previously, without departing from the spirit and scope of one or more aspects of the present invention.

Moreover, data processing system 1100 may take the form of any of a number of different data processing systems including client computing devices, server computing devices, a tablet computer, laptop computer, telephone or other communication device, a personal digital assistant (PDA), or the like. In some illustrative examples, data processing system 1100 may be a portable computing device which is configured with flash memory to provide non-volatile memory for storing operating system files and/or user-generated data, for example. Essentially, data processing system 1100 may be any known or later developed data processing system without architectural limitation.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

Figure 12:
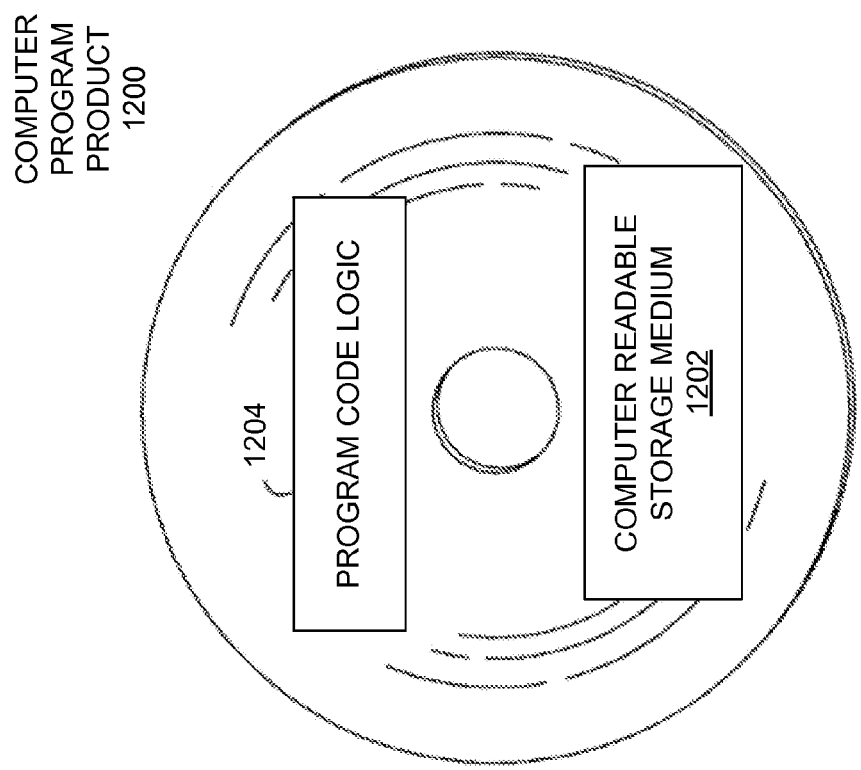
FIG. 12 illustrates a computer program product in accordance with an embodiment.

Referring to FIG. 12, one or more aspects of embodiments can be included in an article of manufacture (e.g., one or more computer program products 1200) having, for instance, computer readable storage media 1202. The media has embodied therein, for instance, computer readable program code (instructions) 1204 to provide and facilitate the capabilities of embodiments. The article of manufacture can be included as a part of a computer system or as a separate product.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM).

Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects and benefits of various embodiments described herein include fixed-endian instruction load and store instructions, in which one particular endian mode (e.g., big-endian) is used when transferring data between memory and a vector register, regardless of the current endian-mode of the processor. Technical effects and benefits also include endian-mode-independent load and store instructions, in which the instruction itself, rather than the current endian-mode of the processor, controls the endian mode to be used when transferring data between memory and a vector register.

What is claimed is:

1. A computer system for processing vectors, the system comprising:
   a memory; and
   a bi-endian mode vector processor including a plurality of registers, each of the registers including a plurality of elements;
   the computer system configured to perform a method comprising:
      obtaining, by the processor, an instruction specifying an operation, the instruction further specifying one of the registers as a source register and one of the registers as a destination register;
      determining, by the processor, whether the instruction is an element-ordering-sensitive instruction;
      based on determining that the instruction is an element-ordering-sensitive instruction:
         obtaining, by the processor, an endian mode; and
         executing the instruction by the processor by performing the operation on the elements of the source register in accordance with the obtained endian mode and writing a result of the operation to the destination register; and
      based on determining that the instruction is not an element-ordering-sensitive instruction, executing the instruction by the processor by performing the operation on the elements of the source register in accordance with a first endian mode and writing a result of the operation to the destination register.

2. The computer system of claim 1, wherein the source register and the destination register each correspond to a respective vector register.

3. The computer system of claim 1, the computer system further configured for:
   based on determining that the instruction is an element-ordering-sensitive instruction:
      determining that the obtained endian mode corresponds to the first endian mode; and
      based on the determination that the obtained endian mode corresponds to the first endian mode, performing the operation on all elements of the source register sequentially from a leftmost one of the elements of the source register to a rightmost one of the elements of the source register.

4. The computer system of claim 1, the computer system further configured for:
   based on determining that the instruction is an element-ordering-sensitive instruction
      determining that the obtained endian mode corresponds to a second endian mode; and
      based on the determination that the obtained endian mode corresponds to the second endian mode, performing the operation on all of the elements of the source register sequentially from a rightmost one of the elements of the source register to a leftmost one of the elements of the source register.

5. The computer system of claim 1, the computer system further configured for:
   based on determining that the instruction is an element-ordering-sensitive instruction:
      modifying a reference in the instruction to one of the elements of the source register in accordance with the obtained endian mode; and
      performing the operation specified in the instruction with the modified element reference without an additional reference to the obtained endian mode.

6. The computer system of claim 1, the method further comprising:
   based on determining that the instruction is an element-ordering-sensitive instruction:
      providing, based on the obtained endian mode corresponding to the first endian mode, an unmodified form of an operand corresponding to at least one of the elements of the source register;
      modifying, based on the obtained endian mode corresponding to a second endian mode, a first element of the source register, according to the second endian mode, into a second element, according to the first endian mode; and
      providing the modified source register as an operand.

7. The computer system of claim 6, wherein the modifying inverts at least one of the significant bits of the first element.

8. The computer system of claim 1, the method further comprising:
   based on determining that the instruction is an element-ordering-sensitive instruction:
      providing, based on the obtained endian mode corresponding to the first endian mode, a first input operand to a first operand port of the processor and providing a second input operand to a second operand port of the processor;
      and
      providing, based on the obtained endian mode corresponding to the second endian mode, a first input operand to the second operand port of the processor and providing a second input operand to the first operand port of the processor.

9. The computer system of claim 1, the method further comprising:
   based on determining that the instruction is an element-ordering-sensitive instruction:
      providing, based on the obtained endian mode corresponding to the first endian mode, at least one input operand to circuitry within the processor without modification;
      reversing, based on the obtained endian mode corresponding to the second endian mode, all elements of the at least one input operand; and
      providing the reversed at least one input operand to the circuitry within the processor.

10. The computer system of claim 1, the method further comprising:
    based on determining that the instruction is an element-ordering-sensitive instruction:
       providing, based on the obtained endian mode corresponding to the first endian mode, at least one output of circuitry within the processor as a result operand of an instruction without modification;
       modifying, based on the obtained endian mode corresponding to the second endian mode, the output of the circuitry within the processor; and
       providing the modified output as the result operand of the instruction.

11. The computer system of claim 10, wherein the modifying includes a reversing of all elements of the output.

* * * * *